(12) United States Patent
Hong et al.

(10) Patent No.: US 9,412,039 B2
(45) Date of Patent: Aug. 9, 2016

(54) BLUR DETECTION SYSTEM FOR NIGHT SCENE IMAGES

(75) Inventors: Li Hong, San Diego, CA (US); Itaru Homma, Tokyo (JP)

(73) Assignee: NIKON CORPORATION (JP)

( * ) Notice: Subject to any disclaimer, the term of this patent is extended or adjusted under 35 U.S.C. 154(b) by 288 days.

(21) Appl. No.: 13/823,015

(22) PCT Filed: Nov. 3, 2010

(86) PCT No.: PCT/US2010/055325
§ 371 (c)(1),
(2), (4) Date: Mar. 13, 2013

(87) PCT Pub. No.: WO2012/060835
PCT Pub. Date: May 10, 2012

(65) Prior Publication Data
US 2013/0169824 A1    Jul. 4, 2013

(51) Int. Cl.
| | |
|---|---|
| *G06T 7/00* | (2006.01) |
| *G06K 9/46* | (2006.01) |
| *H04N 5/217* | (2011.01) |
| *H04N 5/232* | (2006.01) |
| *G06K 9/03* | (2006.01) |

(52) U.S. Cl.
CPC ............ *G06K 9/4661* (2013.01); *G06T 7/0002* (2013.01); *H04N 5/217* (2013.01); *H04N 5/23229* (2013.01); *H04N 5/23254* (2013.01); *G06K 9/036* (2013.01); *G06T 2207/10024* (2013.01); *G06T 2207/30168* (2013.01)

(58) Field of Classification Search
CPC ....................... G06T 5/003; G06T 2207/20201
See application file for complete search history.

(56) References Cited

U.S. PATENT DOCUMENTS

| | | | |
|---|---|---|---|
| 6,298,145 | B1 | 10/2001 | Zhang et al. |
| 6,347,153 | B1 | 2/2002 | Triplett |
| 6,548,800 | B2 | 4/2003 | Chen et al. |
| 6,888,564 | B2 | 5/2005 | Caviedes |
| 6,987,530 | B2 | 1/2006 | McConica |
| 7,079,704 | B2 | 7/2006 | Caviedes |

(Continued)

FOREIGN PATENT DOCUMENTS

| | | |
|---|---|---|
| WO | WO 2010/008802 A1 | 1/2010 |
| WO | WO 2011/139288 A1 | 11/2011 |
| WO | WO 2012/060835 A1 | 5/2012 |

OTHER PUBLICATIONS

PCT International Search Report and Written Opinion for PCT/US2010/055325 filed Nov. 3, 2010.

(Continued)

*Primary Examiner* — Siamak Harandi
(74) *Attorney, Agent, or Firm* — Roeder & Broder LLP; Steven G. Roeder

(57) ABSTRACT

A system (300) for detecting whether an image (16) is blurred performs the steps of: identifying valid light trails in the test image (308), and classifying the test image as blurred if there is a sufficient number of matching valid light trails oriented in a repetitive pattern (310). The system (300) is designed to automatically detect whether a night scene image (16) is blurred based on the existence and characteristics of any light trails (552) in the captured image (16). Because the method extracts the characteristics of the light trails (552) and analyzes these light trails (552), it accurately detects blur in the challenging night scene images and has a relatively low false positive rate.

20 Claims, 5 Drawing Sheets

(56) References Cited

U.S. PATENT DOCUMENTS

| | | |
|---|---|---|
| 7,119,854 B2 | 10/2006 | Dantwala |
| 7,181,082 B2 | 2/2007 | Feng |
| 7,257,273 B2 | 8/2007 | Li et al. |
| 7,356,195 B2 | 4/2008 | Shaked et al. |
| 7,519,231 B2 | 4/2009 | Li et al. |
| 7,545,985 B2 | 6/2009 | Zhang et al. |
| 7,586,520 B2 | 9/2009 | Igarashi |
| 7,653,256 B2 | 1/2010 | Kanda et al. |
| 7,668,388 B2 | 2/2010 | Bryll |
| 2001/0016054 A1 | 8/2001 | Banker |
| 2002/0145106 A1 | 10/2002 | Chen et al. |
| 2003/0138163 A1 | 7/2003 | Chen et al. |
| 2004/0081370 A1 | 4/2004 | Murphy |
| 2004/0218914 A1 | 11/2004 | Sato |
| 2005/0244074 A1 | 11/2005 | Shaked et al. |
| 2006/0056731 A1 | 3/2006 | Bouk et al. |
| 2006/0078217 A1 | 4/2006 | Poon et al. |
| 2006/0147107 A1 | 7/2006 | Zhang et al. |
| 2006/0147125 A1 | 7/2006 | Caviedes |
| 2006/0153471 A1 | 7/2006 | Lim et al. |
| 2006/0188170 A1 | 8/2006 | Kanda et al. |
| 2006/0204121 A1 | 9/2006 | Bryll |
| 2007/0071346 A1 | 3/2007 | Li et al. |
| 2007/0263897 A1 | 11/2007 | Ong et al. |
| 2008/0013861 A1 | 1/2008 | Li et al. |
| 2008/0025627 A1* | 1/2008 | Freeman et al. ............ 382/255 |
| 2008/0094498 A1* | 4/2008 | Mori ............................ 348/352 |
| 2008/0226148 A1 | 9/2008 | Gu et al. |
| 2009/0016616 A1 | 1/2009 | Kasahara |
| 2009/0079862 A1 | 3/2009 | Subbotin |
| 2009/0116713 A1 | 5/2009 | Yan et al. |
| 2009/0196524 A1 | 8/2009 | Godin |
| 2010/0272356 A1 | 10/2010 | Hong |
| 2011/0019909 A1 | 1/2011 | Farid |
| 2013/0033608 A1 | 2/2013 | Hong |

OTHER PUBLICATIONS

Ming-Yang Yu et al., Smart Album—Photo Filtering by Effect Detections, SIGGRAPH 2008, Aug. 11-15, 2008, ISBN 978-1-60558-466-9/08/20008, Los Angeles, CA.

Renting Liu et al., Image Partial Blur Detection and Classification, Dept. of Computer Science and Engineering, The Chinese University of Hong Hong, {rtliu,zrli, leojia}@cse.cuhk.edu.hk.The work described in this paper was fully supported by a grant from Research Grants Council of Hong Kong Special Administrative Region, China (Project No. 412307).

Robert A. Gonsalves, Phase retrieval and diversity in adaptive optics, Optical Engineering Sep./Oct. 1982, vol. 21 No. 5, © 1982 Society of Photo-Optical Instrumentation Engineers.

B. Zhang, J.P. Allebach and Z. Pizlo, "An investigation of Perceived Sharpness and Sharpness Metrics," 2005, Proc. SPIE vol. 5668, Dept. of Psychological Sciences, Purdue University.

F. Crete, T. Dolmiere, P. Ladret and M. Nicolas "The Blur Effect: Perception and Estimation with a New No-Reference Perceptual Blur Metric", 2007, Proc. SPIE vol. 6492, author manuscript, hal-00232709, version 1-1 Feb. 2008, published in SPIE Electronic Imaging Symposium Conf Human Vision and Electronic Imaging, San Jose (2007).

I.V. Safonov, M.N. Rychagov, K. Kang and S.H. Kim, "Adaptive sharpening of photos," (Proceedings Paper) 2008, Proc. SPIE vol. 6807 (2008) Samsung Research Center, Moscow Russia 125047; Samsung Digital Printing Division, Suwon, Korea 443-742.

D. Shaked and I. Tastl, "Sharpness Measure: Towards Automatic Image Enhancement," 2007, SPIE vol. 6492 presented IEEE International Conference on Image Processing, © Copyright 2005 Hewlett-Packard Development Company, L.P.

S.H. Lim, J. Yen and P. Wu, "Detection of Out-Of-Focus Digital Photographs", Jan. 20, 2005, HPL-2005-14, HP Labs Technical Report, © Copyright Hewlett-Packard Company 2005.

International Preliminary Report on Patentability mailed May 16, 2013 for PCT/US2010/055325 filed Nov. 3, 2010 (parent application).

* cited by examiner

BLUR DETECTION SYSTEM FOR NIGHT SCENE IMAGES

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, that image will be blurred.

As digital photography becomes more and more popular, image quality assessment such as sharpness measurement has been a topic of great interest. Sharpness is generally described as the measurement of either the clarity of details or the transition of edges inside image. Currently, there are certain methods based on measuring sharp information inside the image that are used to evaluate the sharpness of an image. Unfortunately, existing methods do not accurately and consistently evaluate the level of sharpness over a broad variety of images. For example, conventional methods easily fail to detect blurry night scene images with the presence of saturated light trails due to the fact that the light trails result in "false" sharp information.

SUMMARY

The present invention is directed to a method for determining if a test image is blurred. In one embodiment, the method includes the steps of: identifying valid light trails in the test image, and classifying the test image as blurred if there is a sufficient number of matching valid light trails oriented in a similar repetitive pattern. As provided herein, in certain embodiments, the method uses an algorithm that automatically detects whether a night scene image is blurred based on the existence and characteristics of any light trails in the image. Because the present invention extracts the characteristics of the light trails and analyzes these light trails, it accurately detects blur in the challenging night scene images and has a relatively low false positive rate.

In one embodiment, the method first identifies if the test image is a potential night scene. With this design, the method is used only on night images to save computing power. Further, the method can include down sampling the test image to save computing power.

As provided herein, the step of identifying valid light trails can include the step of identifying saturated pixels in the image by identifying pixels having a value that is greater than a predetermined light saturation threshold. Further, the step of identifying valid light trails includes the step of building potential light trails from connected saturated pixels. Moreover, the step of identifying valid light trails can include the step of computing one or more region properties of the potential light trails and identifying valid light trails based on the region properties of the potential light trails.

In one embodiment, the step of classifying the test image as blurred can include the step of comparing the size and orientation of the valid light trails. Further, the step of classifying the test image as blurred can include the step of comparing the proximity of the valid light trails.

The present invention is also directed to a camera including a capturing system for capturing a test image, and a control system that utilizes one or more of the methods described above to estimate if the test image is blurred. Alternatively, the present invention can be utilized in a personal computer for post-processing of one or more images, or on an on-line site for post-processing of one or more images.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
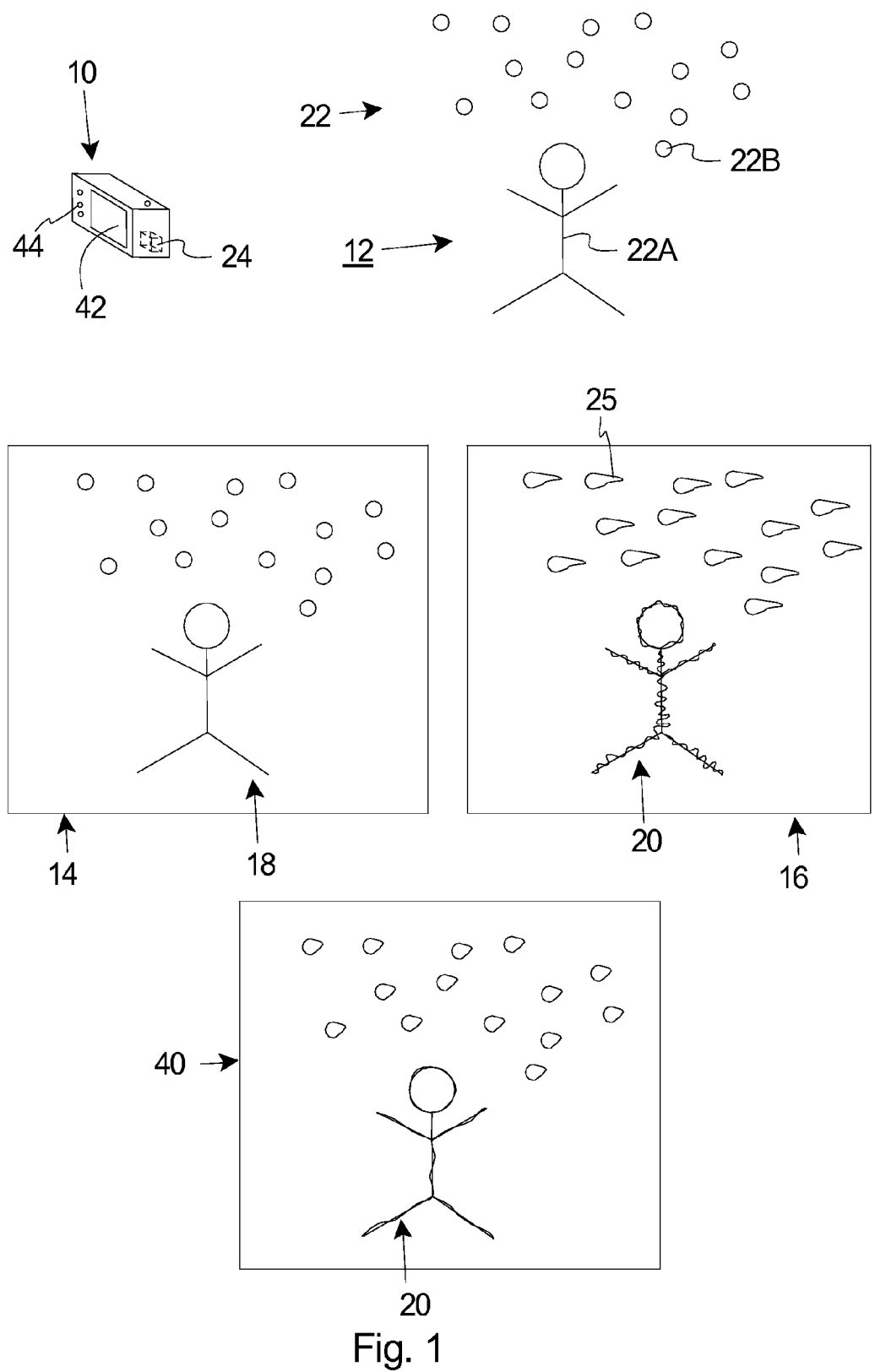
FIG. 1 is a simplified view of a scene, an image apparatus having features of the present invention, a raw, first captured image of the scene, a raw, second captured image of the scene, and an adjusted image.

FIG. 1 is a simplified perspective view of an image apparatus 10 having features of the present invention, and a scene 12. FIG. 1 also illustrates a raw first captured image 14 (illustrated away from the image apparatus 10), and a raw second captured image 16 (illustrated away from the image apparatus 10), each captured by the image apparatus 10. In FIG. 1, the first captured image 14 is intended to illustrate a sharp image 18 (including non-wavy lines) and the second captured image 16 is intended to illustrate image blur 20 (including wavy lines). For example, movement of the image apparatus 10, and/or movement of an object 22 in the scene 12 during the capturing of the blurred image 16 can cause motion blur 20 in the image 14.

In one embodiment, the image apparatus 10 includes a control system 24 (illustrated in phantom) that uses a unique method for estimating if one or more of the images 14, 16 captured at night is blurred. Subsequently, a deblurring process can be applied to only the images 16 that are determined to be blurred. Thus, a sharp image 14 will not be unnecessarily subjected to the deblurring process.

More specifically, in certain embodiments, the control system 24 uses an algorithm that automatically detects whether a night scene image 14, 16 is blurred based on the existence and characteristics of any light trails 25 in the captured image 14, 16. Because the present invention extracts the characteristics of the light trails 25 from the test image 16 and analyzes these light trails 25, it accurately detects blur in the challenging night scene images and has a relatively low false positive rate. In contrast, conventional blur metric algorithms based on measuring sharp information inside image easily fail to detect blurry night scene images with the presence of light trails due to the fact that the light trails often lead to "false" sharp information.

As is known, when a point of light is captured while the camera is being moved (e.g. shaked), the resulting image can include the point of light with a trace having a trace direction that reflects and corresponds to the motion of the camera. For example, the second captured image 16 was captured while moving the camera 10 sideways. As a result thereof the light trails 25 in the second captured image 16 extend horizontally. As used herein the term light trail 25 include the captured light plus the trace that results from movement.

The type of scene 12 captured by the image apparatus 10 can vary. For example, the scene 12 can include one or more objects 22, e.g. animals, plants, mammals, light sources, and/or environments. For simplicity, in FIG. 1, the scene 12 is a night scene that is illustrated as including a simplified stick figure of a person 22A, and a plurality of spaced apart light sources 22B. Although it is recognized that the night scene may not include a person or any light sources.

Figure 2:
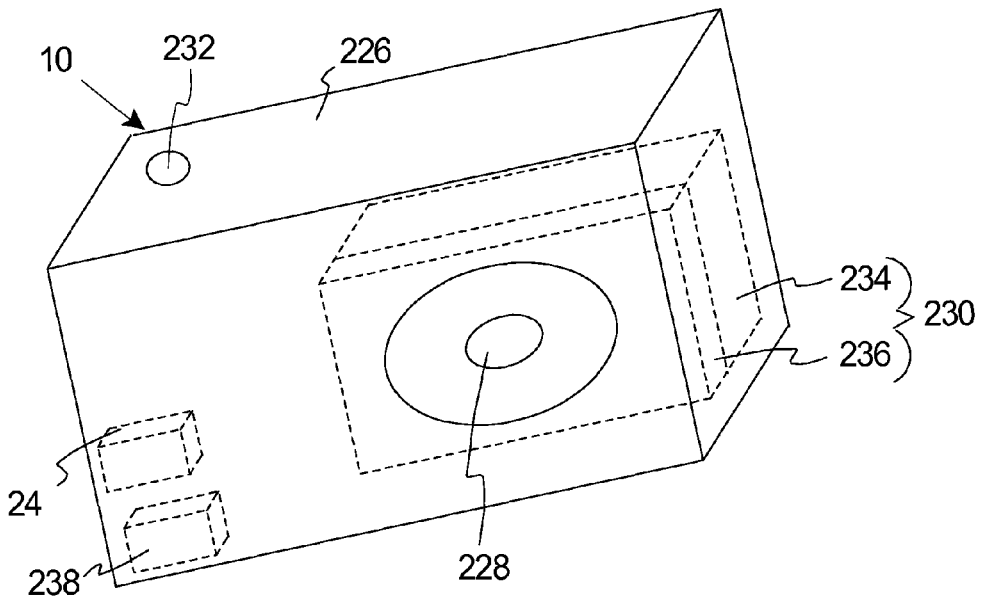
FIG. 2 is a simplified front perspective view of the image apparatus in FIG. 1.

FIG. 2 illustrates a simplified, front perspective view of one non-exclusive embodiment of the image apparatus 10. In this embodiment, the image apparatus 10 is a digital camera, and includes an apparatus frame 226, an optical assembly 228, and a capturing system 230 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 226 can be rigid and support at least some of the other components of the image apparatus 10. In one embodiment, the apparatus frame 226 includes a generally rectangular shaped hollow body that forms a cavity that receives and retains at least some of the other components of the camera. The apparatus frame 226 can include a shutter button 232 that causes the capturing system 230 to capture the image.

The optical assembly 228 can include a single lens or a combination of lenses that work in conjunction with each other to focus light onto the capturing system 230. In one embodiment, the image apparatus 10 includes an autofocus assembly (not shown) including one or more lens movers that move one or more lenses of the optical assembly 228 in or out until the sharpest possible image of the subject is received by the capturing system 230.

The capturing system 230 captures information for the images 14, 16 (illustrated in FIG. 1). The design of the capturing system 230 can vary according to the type of image apparatus 10. For a digital-type camera, the capturing system 230 includes an image sensor 234 (illustrated in phantom) e.g. charge coupled device, a filter assembly 236 (illustrated in phantom) e.g. a Bayer filter, and a storage system 238 (illustrated in phantom). The storage system 238 can be fixedly or removably coupled to the apparatus frame 226. Non-exclusive examples of suitable storage systems 238 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 226 and the rest of the components of the image apparatus 10. Further, in this embodiment, the control system 24 is positioned within the apparatus frame 226 for in camera processing of the images. Alternatively, the control system that utilizes the algorithm disclosed herein can be separate from the camera (e.g. a computer or a website) that performs post-processing on the images 14, 16.

Referring back to FIG. 1, the control system 24 includes software and/or firmware that utilizes one or more methods to determine if a given image 14, 16 is sharp or blurred. In various embodiments, the control system 24 includes firmware that has previously been programmed during the manufacturing process that predicts whether a new image 14, 16 (also sometimes referred to herein as a "test image") subsequently taken by the image apparatus 10 is sharp or blurred.

Further, in certain embodiments, the control system 24 can include software that reduces the amount of blur 20 in the blurred image 16 to provide an adjusted image 40. In this example, the control system 24 can determine that the first image 14 is sharp and that no further processing is necessary. Further, the control system 24 can determine that the second image 16 is blurred. Subsequently, the control system 24 reduces the amount of blur 20 in the second image 16 to provide the adjusted image 40.

The image apparatus 10 can include an image display 42 that displays the raw images 14, 16 and/or the adjusted image 40. With this design, the user can decide which images 14, 16, 40, should be stored and which images 14, 16, 40, should be deleted. Further, the image display 42 can display other information that can be used to control the functions of the image apparatus 10.

Moreover, the image apparatus 10 can include one or more control switches 44 electrically connected to the control system 24 that allows the user to control the functions of the image apparatus 10. For example, one or more of the control switches 44 can be used to selectively switch the image apparatus 10 to the blur evaluation and reduction processes disclosed herein. In certain embodiments, in order to save computation, the present invention can be selectively applied (manually or automatically) to only certain types of images, e.g. low light images.

Figure 3:
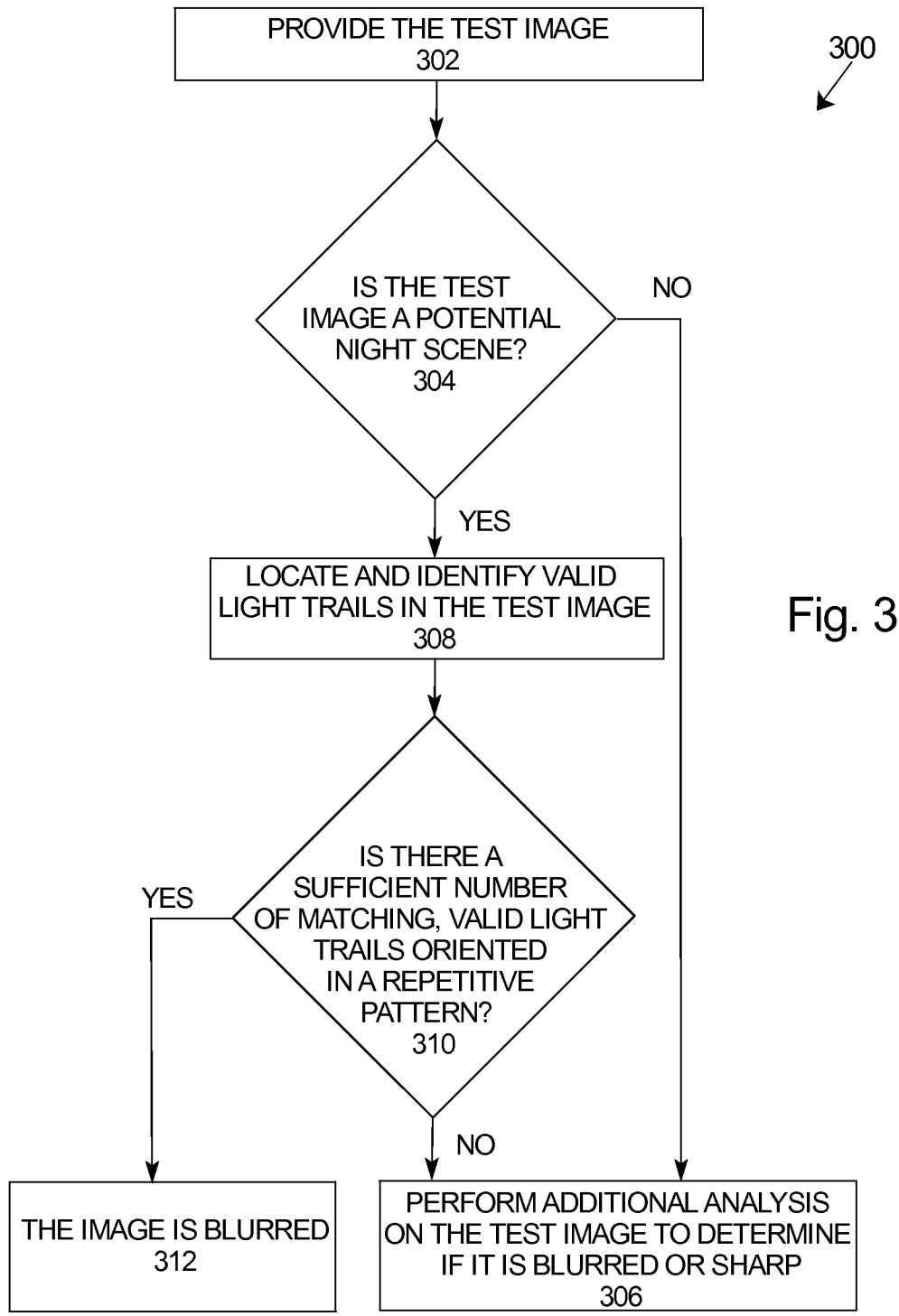
FIG. 3 is a flow chart that illustrates one embodiment of a blur detection method for night scenes having features of the present invention.

FIG. 3 is a flow chart that illustrates one embodiment of a blur detection method 300 having features of the present invention. As an overview, the night scene images are identified. For each identified night scene image, the light trails (saturated/near saturated lights) patterns are extracted from the test image. A night scene image is classified as blurry if there exists strong repetitive patterns of light trails. Further, the present invention utilizes various constraints to confine the shape, size, distance, etc of the light trails in order to reduce false positive situation (i.e., misclassify sharp night scene image as blurry).

As illustrated in FIG. 3, at step 302, the test image is provided. For example, the test image can be captured by the camera for in camera processing of the image. Alternatively, the test image can be provided to a separate control system that utilizes the algorithm disclosed herein.

In certain embodiments, the present algorithm accurately determines if a night scene image is blurred. Thus, in order to save computation, the present algorithm is selectively applied only to night scene images. Accordingly, at step 304, the test image and/or the metadata of the camera relating to the test image is analyzed to determine if the test image is a potential night scene image. In one embodiment, the algorithm determines if the test image is a potential night scene by analyzing the lighting condition at the time the test image was captured. For example, the algorithm can identify if the test image is a potential night scene image by reviewing the exposure value (EV) of the image apparatus (that captured the image) during the capturing of the test image. In one example, a conservative low exposure value threshold can be selected, and (i) each image that has an exposure value lower than this exposure value threshold is considered as night scenes, and (ii) each image that has an exposure value greater than or equal to this exposure value threshold is not considered to be a night scene. In alternative, non-exclusive embodiments, the exposure value threshold can be approximately 6.5, 6, or 5.5. Alternatively, other values can be utilized for the exposure value threshold.

There are other ways to save computational cost. In one non-exclusive example, in addition to checking if the image is a night scene, the algorithm can also check for a handholdable factor of the night scene image. The handholdable factor is equal to the focal length multiplied by the exposure time. If the handholdable factor is too small, there is no need to apply light trail algorithm, as motion blur is unlikely due to small handholdable factor. As a non-exclusive example, the handholdable factor threshold can be equal to one (TH=1).

Next, if it is determined that the image is not a potential night scene, at step 306, the control system can use another conventional method for measuring the sharpness of the test image. Thus, the conventional method can be used to determine if the image is blurred or sharp. A suitable, non-exclusive example of a convention method for measuring image sharpness includes a learning-based image sharpness classification algorithm described in PCT application No. US2010/0039843, entitled "Image Sharpness Classification System", the contents of which are incorporated herein by reference. Another suitable image sharpness classification algorithm is described in D. Shaked et al. "Sharpness Measure: Towards Automatic Image Enhancement", Proc. IEEE International Conference on Image Processing 2005.

Alternatively, if it is determined that the image is a potential night scene, at step 308, valid light trails are located and identified in the test image. Stated in another fashion, for each identified night scene image, the valid light trails (saturated/near saturated lights) patterns are extracted from the test image.

Figure 4:
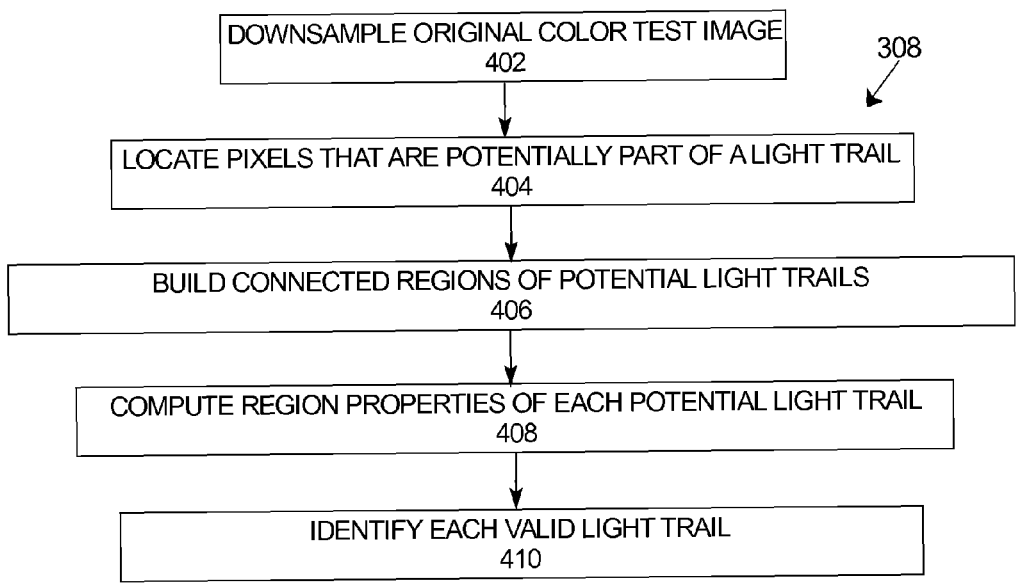
FIG. 4 is a flow chart that further illustrates a portion of the blur detection method of FIG. 3.

FIG. 4 is a flow chart that illustrates one method that can be used to locate and identify valid light trails in the image. As illustrated in FIG. 4, the method utilized for identifying and extracting relevant potential light trails in the test image can include the step 402 of down sampling the original color test image in order to save computational cost. For example, the original color image can be down sampled (e.g. sub-sampled by a downsizing factor of one-third "⅓" or one-fourth "¼"). It should be noted that this step is optional to save computational cost.

Subsequently, at step 404, the algorithm locates pixels that are potentially part of a light trail. This can be done by comparing the highest value among all color channels for each pixel with a light saturation threshold. More specifically, for example, for each pixel, in a red, green, blue ("RGB") color space, the red value, the green value and the blue value are compared to select the highest value. As a non-exclusive example, for a value scale of 0-255, if the pixel has a red value of 113, a green value of 205, and a blue value of 175, the highest value for that pixel is the green value of 205. In this example, the pixel has three values, and the highest value for that pixel is compared to the light saturation threshold. Moreover, as a non-exclusive example, the light saturation threshold can be 190. In this example, the highest value (205 of the green channel) is greater than or equal to the light saturation threshold (190 in this example). Thus, this pixel is classified as a potential light trail pixel.

Alternatively, if the light saturation threshold is set to 210 in this example, the highest value (205 of the green channel) is less than the light saturation threshold (210 in this example). Thus, this pixel is not classified as a potential light trail pixel.

It should be noted that the light saturation threshold can be different than the examples provided herein. Further, in the examples provided herein, for each pixel, the value of only one of the color channels has to be greater than the light saturation threshold for the pixel to be classified as potentially part of a light trail. Alternatively, for example, for each pixel, the algorithm can require that the value of multiple channels be greater than the light saturation threshold for the pixel to be classified as potentially part of a light trail.

Figure 5:
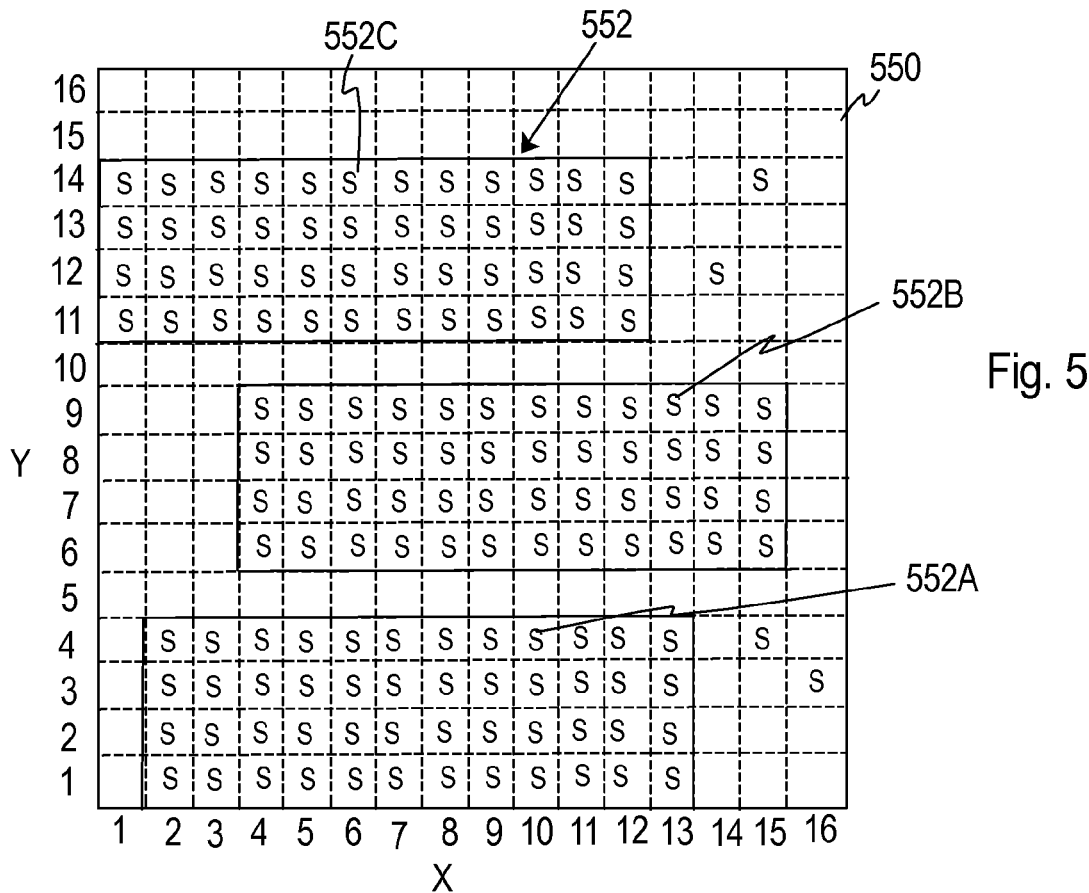
FIG. 5 is a simplified pixel representation of a portion of a captured image.

FIG. 5 is an extremely simplified sixteen by sixteen pixel 550 representation of a portion of the blurred, second captured image 16 (illustrated in FIG. 1). For simplicity, in this example, three separate light trails 552 are illustrated. It should be noted that the sixteen by sixteen pixel grid is merely a representation and that the light trails will typically be larger (e.g. more pixels) and farther apart than what is represented in FIG. 5.

It should also be noted that FIG. 5 includes a two-dimensional orientation system that illustrates an X axis, and a Y axis. In this example, each of the pixels 550 can be labeled relative to this coordinate system. For example, the bottom left corner pixel 550 can be indentified as pixel (X1, Y1), while the top right corner pixel 550 can be identified as pixel (X16, Y16). Alternatively, the pixels 550 can be identified in another fashion.

Further, it should be noted that designation of "S" has been used to identify a potential light trail pixel (e.g. a pixel that has a highest color channel value that is greater than or equal to the light saturation threshold). Further, the pixels that are not identified as potential light trail pixels (e.g. has a highest color channel value that is less than the light saturation threshold) have been left blank.

In FIG. 5, pixels (X2, Y1), (X3, Y1), (X4, Y1), (X5, Y1), (X6, Y1), (X7, Y1), (X8, Y1), (X9, Y1), (X10, Y1), (X11, Y1), (X12, Y1), (X13, Y1), (X2, Y2), (X3, Y2), (X4, Y2), (X5, Y2), (X6, Y2), (X7, Y2), (X8, Y2), (X9, Y2), (X10, Y2), (X11, Y2), (X12, Y2), (X13, Y2), (X2, Y3), (X3, Y3), (X4, Y3), (X5, Y3), (X6, Y3), (X7, Y3), (X8, Y3), (X9, Y3), (X10, Y3), (X11, Y3), (X12, Y3), (X13, Y3), (X2, Y4), (X3, Y4), (X4, Y4), (X5, Y4), (X6, Y4), (X7, Y4), (X8, Y4), (X9, Y4), (X10, Y4), (X11, Y4), (X12, Y4), (X13, Y4), (X4, Y6), (X5, Y6), (X6, Y6), (X7, Y6), (X8, Y6), (X9, Y6), (X10, Y6), (X11, Y6), (X12, Y6), (X13, Y6), (X14, Y6), (X15, Y6), (X4, Y7), (X5, Y7), (X6, Y7), (X7, Y7), (X8, Y7), (X9, Y7), (X10, Y7), (X11, Y7), (X12, Y7), (X13, Y7), (X14, Y7), (X15, Y7), (X4, Y8), (X5, Y8), (X6, Y8), (X7, Y8), (X8, Y8), (X9, Y8), (X10, Y8), (X11, Y8), (X12, Y8), (X13, Y8), (X14, Y8), (X15, Y8), (X4, Y9), (X5, Y9), (X6, Y9), (X7, Y9), (X8, Y9), (X9, Y9), (X10, Y9), (X11, Y9), (X12, Y9), (X13, Y9), (X14, Y9), (X15, Y9), (X1, Y11), (X2, Y11), (X3, Y11), (X4, Y11), (X5, Y11), (X6, Y11), (X7, Y11), (X8, Y11), (X9, Y11), (X10, Y11), (X11, Y11), (X12, Y11), (X1, Y12), (X2, Y12), (X3, Y12), (X4, Y12), (X5, Y12), (X6, Y12), (X7, Y12), (X8, Y12), (X9, Y12), (X10, Y12), (X11, Y12), (X12, Y12), (X1, Y13), (X2, Y13), (X3, Y13), (X4, Y13), (X5, Y13), (X6, Y13), (X7, Y13), (X8, Y13), (X9, Y13), (X10, Y13), (X11, Y13), (X12, Y13), (X1, Y14), (X2, Y14), (X3, Y14), (X4, Y14), (X5, Y14), (X6, Y14), (X7, Y14), (X8, Y14), (X9, Y14), (X10, Y14), (X11, Y14), (X12, Y14), (X16, Y3), (X15, Y4), (X14, Y12), (X15, Y14) have been identified as potential light trail pixels.

Next, referring back to FIG. 4, at step 406, connected regions are built from pixels labeled as potentially part of a light trail 552 (illustrated in FIG. 5). Stated in another fashion, each potential light trail pixel is compared with its neighbors to determine if its neighboring pixels are also labeled as potential light trail pixels. For example, referring back to FIG. 5, pixels (X2, Y1), (X3, Y1), (X4, Y1), (X5, Y1), (X6, Y1), (X7, Y1), (X8, Y1), (X9, Y1), (X10, Y1), (X11, Y1), (X12, Y1), (X13, Y1), (X2, Y2), (X3, Y2), (X4, Y2), (X5, Y2), (X6, Y2), (X7, Y2), (X8, Y2), (X9, Y2), (X10, Y2), (X11, Y2), (X12, Y2), (X13, Y2), (X2, Y3), (X3, Y3), (X4, Y3), (X5, Y3), (X6, Y3), (X7, Y3), (X8, Y3), (X9, Y3), (X10, Y3), (X11, Y3), (X12, Y3), (X13, Y3), (X2, Y4), (X3, Y4), (X4, Y4), (X5, Y4), (X6, Y4), (X7, Y4), (X8, Y4), (X9, Y4), (X10, Y4), (X11, Y4), (X12, Y4), (X13, Y4) have been identified as potential light trail pixels and these pixels are adjacent to each other. Thus, these pixels together can be classified as a first potential light trail 552A.

Somewhat similarly, pixels (X4, Y6), (X5, Y6), (X6, Y6), (X7, Y6), (X8, Y6), (X9, Y6), (X10, Y6), (X11, Y6), (X12, Y6), (X13, Y6), (X14, Y6), (X15, Y6), (X4, Y7), (X5, Y7), (X6, Y7), (X7, Y7), (X8, Y7), (X9, Y7), (X10, Y7), (X11, Y7), (X12, Y7), (X13, Y7), (X14, Y7), (X15, Y7), (X4, Y8), (X5, Y8), (X6, Y8), (X7, Y8), (X8, Y8), (X9, Y8), (X10, Y8), (X11, Y8), (X12, Y8), (X13, Y8), (X14, Y8), (X15, Y8), (X4, Y9), (X5, Y9), (X6, Y9), (X7, Y9), (X8, Y9), (X9, Y9), (X10, Y9), (X11, Y9), (X12, Y9), (X13, Y9), (X14, Y9), (X15, Y9) have been identified as potential light trail pixels and these pixels are adjacent to each other. Thus, these pixels together can be classified as a second potential light trail 552B.

Further, pixels (X1, Y11), (X2, Y11), (X3, Y11), (X4, Y11), (X5, Y11), (X6, Y11), (X7, Y11), (X8, Y11), (X9, Y11), (X10, Y11), (X11, Y11), (X12, Y11), (X1, Y12), (X2, Y12), (X3, Y12), (X4, Y12), (X5, Y12), (X6, Y12), (X7, Y12), (X8, Y12), (X9, Y12), (X10, Y12), (X11, Y12), (X12, Y12), (X1, Y13), (X2, Y13), (X3, Y13), (X4, Y13), (X5, Y13), (X6, Y13), (X7, Y13), (X8, Y13), (X9, Y13), (X10, Y13), (X11, Y13), (X12, Y13), (X1, Y14), (X2, Y14), (X3, Y14), (X4, Y14), (X5, Y14), (X6, Y14), (X7, Y14), (X8, Y14), (X9, Y14), (X10, Y14), (X11, Y14), (X12, Y14) have been identified as potential light trail pixels and these pixels are adjacent to each other. Thus, these pixels together can be classified as a third potential light trail 552C.

In contrast, pixels (X16, Y3), (X15, Y4), (X14, Y12), and (X15, Y14) have been identified as potential light trail pixels, but these pixels are not adjacent to each other or other potential light trail pixels. Thus, these pixels are not part of a potential light trail.

Subsequently, referring back to FIG. 4, at step 408, one or more region properties of each of the connected regions (potential light trails 552A, 552B, 552C) are computed. It should be noted that most light trails have a thin line shape that is oriented along the direction of motion. Thus, light trails are generally not circular in shape. As provided herein, the present invention calculates one or more region properties for each of the potential light trails 552A, 552B, 552C to determine if each respective potential light trail 552A, 552B, 552C is not circular in shape and/or has a thin line shape.

In one example, for each of the potential light trails 552A, 552B, 552C, one or more of the following region properties can be calculated (i) an area of the respective potential light trail (connected region), (ii) a bounding box of the respective potential light trail, and (iii) a perimeter of the respective potential light trail.

Referring back to FIG. 5, the area, the bounding box, and perimeter of each of the potential light trails 552A, 552B, 552C is calculated. As provided herein, the area of each potential light trail 552A, 552B, 552C is equal to the number of pixels in the respective light trail. In FIG. 5, each of the potential light trails 552A, 552B, 552C is the same size, shape, and orientation for ease of illustration. Thus, in the example of FIG. 5, each of the potential light trails 552A, 552B, 552C has an area of forty-eight (48) pixels. Alternatively, for a given image, one or more of the potential light trails can have a different size, shape, and/or orientation.

Next, the bounding box for each potential light trail 552A, 552B, 552C can be calculated. For each potential light trail 552A, 552B, 552C, a tight rectangular box is that encloses the respective light trail 552A, 552B, 552C is created, and the rough shape, e.g. the length and width are used to calculate the bounding box. In FIG. 5, for each potential light trail 552A, 552B, 552C, a four high by twelve wide pixel box can be used to encircle each potential light trail 552A, 552B, 552C. In this example, each potential light trail 552A, 552B, 552C has a bounding box with a value of four by twelve. To calculate the bounding box, the corner coordinates are evaluated. For example, the first potential light trial 552A has corner coordinates of (X2, Y1), (X13, Y1), (X2, Y4), and (X13, Y4). In this example, the height is for pixels (Y3−Y1+1) and the width is twelve pixels (X2−X13+1).

Subsequently, the perimeter of each potential light trail 552A, 552B, 552C is calculated. For example, the perimeter can be the number of neighboring pixels along the boundary. In the example illustrated in FIG. 5, each potential light trail 552A, 552B, 552C has a perimeter of twenty-eight.

Next, referring back to FIG. 4, at step 410, the potential light trails 552A, 552B, 552C are evaluated to determine which of the potential light trails 552A, 552B, 552C can be classified as valid light trails. More specifically, at step 410, the algorithm evaluates one or more of the region properties to identify the valid light trails from the total group of potential light trails 552A, 552B, 552C.

As discussed above, most light trails have a non-circular, irregular shape. Further, most light trails are neither too big or too small. Stated in another fashion, properties of a light trail typically include a non-circular shape, a size that is greater than a certain predetermined minimum size and less than a certain predetermined maximum size. Accordingly, in one embodiment, the present invention reviews the potential light trails 552A, 552B, 552C, and classifies potential light trails 552A, 552B, 552C that are non-circular in shape and that are the appropriate size as a valid light trails.

In one non-exclusive embodiment, each potential light trail 552A, 552B, 552C is initially assumed to be a circle. Subsequently, using the area for each potential light trail 552A, 552B, 552C (if assumed to be circular), a radius for each potential light trail 552A, 552B, 552C can be calculated. As is known, the area of a circle is equal to pi times the radius squared ($A = Pi \times r^2$). In the example provided above, if assumed to be circular, each potential light trail 552A, 552B, 552C has a radius of 3.9 ($3.9 = \sqrt{48/Pi}$) using the area. Additionally, as is known, the perimeter of a circle is equal to 2 times pi times the radius. Thus, if assumed to be circular, each potential light trail 552A, 552B, 552C has a radius of 4.5 ($4.5 = 28/(2 \times pi)$).

As provided herein, for each respective potential light trail 552A, 552B, 552C, if it is truly a circle, the radius calculated using the area is approximately equal to the radius calculated using the perimeter. Alternatively, for each respective potential light trail 552A, 552B, 552C if it is not a circle, the radius calculated using the area will differ greatly from the radius calculated using the perimeter. In the present example, the radius calculated using the area (3.9) is not approximately equal to the radius calculated using the perimeter (4.5).

For each potential light trail 552A, 552B, 552C, the closer that the radius calculated using the area is to the radius calculated using the perimeter, the higher the probability that the potential light trail 552A, 552B, 552C is a circle. Further, for each potential light trail 552A, 552B, 552C, the greater difference that the radius calculated using the area is from the radius calculated using the perimeter, the higher the probability that the potential light trail 552A, 552B, 552C is not a circle.

As a non-exclusive example, if the absolute value of the difference between the radius (calculated with the area) and the radius (calculated with the perimeter) and subsequently divided by the radius (calculated with the area) is relatively small, the probability is high that the potential light trail 552A, 552B, 552C has a circular shape. Alternatively, if the absolute value of difference between the radius (calculated with the area) and the radius (calculated with the perimeter) and subsequently divided by the radius (calculated with the area) is relatively large, the probability is high that the potential light trail 552A, 552B, 552C has a non-circular shape.

As provided herein, for each of the potential light trails 552A, 552B, 552C, if the probability is high that it has a circular shape, that particular potential light trail 552A, 552B, 552C is not considered a valid light trail. In contrast, for each of the potential light trails 552A, 552B, 552C, if the probability is high that it does not have a circular shape, then, in certain embodiments, more analysis can be done on that particular potential light trail 552A, 552B, 552C.

For example, for each identified non-circular shaped potential light trail 552A, 552B, 552C, the size of the area is compared to a lower area threshold and a higher area threshold. For each non-circular shaped potential light trail 552A, 552B, 552C, if the size of the area is lower than the lower area threshold or greater than the higher area threshold, that particular potential light trail 552A, 552B, 552C is not considered a valid light trail. Alternatively, for each non-circular shaped potential light trail 552A, 552B, 552C, if the size of the area is greater than the lower area threshold and less than the higher area threshold, then, in certain embodiments, more analysis can be done on that particular potential light trail 552A, 552B, 552C.

Additionally, for example, for each non-circular shaped potential light trail 552A, 552B, 552C, the size of the bounding box is compared to a lower box threshold and a higher box threshold. For each non-circular shaped potential light trail 552A, 552B, 552C, if the size of the bounding box is lower than the lower box threshold or greater than the higher box threshold, that particular potential light trail 552A, 552B, 552C is not considered a valid light trail. Alternatively, for each non-circular shaped potential light trail 552A, 552B, 552C, if the size of the bounding box is greater than the lower box threshold and less than the higher box threshold, then, in certain embodiments, more analysis can be done on that particular potential light trail 552A, 552B, 552C.

It should be noted that the values of the area threshold, and the box threshold can be varied according to the resolution of the image and the amount of down sampling.

As provided herein, in certain embodiments, the present invention attempts to avoid false positives so the algorithm is set up so that the potential light trail 552A, 552B, 552C is not classified as a valid light trail unless the confidence is high that it is a valid light trail.

Moreover, the present invention can utilizes various additional constraints to confine the shape, size, color, distance, etc of the potential light trail 552A, 552B, 552C in order to reduce false positive situations (i.e., misclassify sharp night scene image as blurry).

Stated in another fashion, in certain embodiments, additional constraints can be placed on the potential light trail 552A, 552B, 552C to further confine valid light trails. For example, valid light trails must contain certain amount of saturated/near-saturated pixels. In this example, to be a valid light trail, the potential light trail 552A, 552B, 552C must have a predetermined minimum number of pixels that have a value of greater than or equal to a predetermined light saturation threshold. As a non-exclusive example, the predetermined minimum number of pixels can be approximately ten % of total identified potentially saturated area, and the predetermined light saturation threshold can have a value of approximately 240. However, these numbers can be varied.

Moreover, in certain embodiments, the additional constraint of ignoring whitish-light potential light trails 552A, 552B, 552C can be utilized. As provided herein, in a night city scene with a high rise building in the background, the plurality of illuminated windows can appear as white, thin rectangular slits that are all oriented in the same general direction. Accordingly, in certain embodiments, a potential light trail 552A, 552B, 552C is not considered a valid light trail if it is whitish in color.

Next, referring back to FIG. 3, at step 310, the algorithm evaluates the valid light trails to determine if there is a sufficient number of matching valid light trails that are oriented in a similar direction (e.g. a repetitive pattern). At step 312, if there is a sufficient number of matching valid light trails that are oriented in a strong repetitive pattern, the image is classified as blurred. Alternatively, as illustrated in FIG. 3, at step 306, if there is an insufficient number of matching valid light trails that are oriented in a strong repetitive pattern, then additional analysis (using another method of measuring sharpness) must be performed on the test image to determine if it is sharp or blurred.

Figure 6:
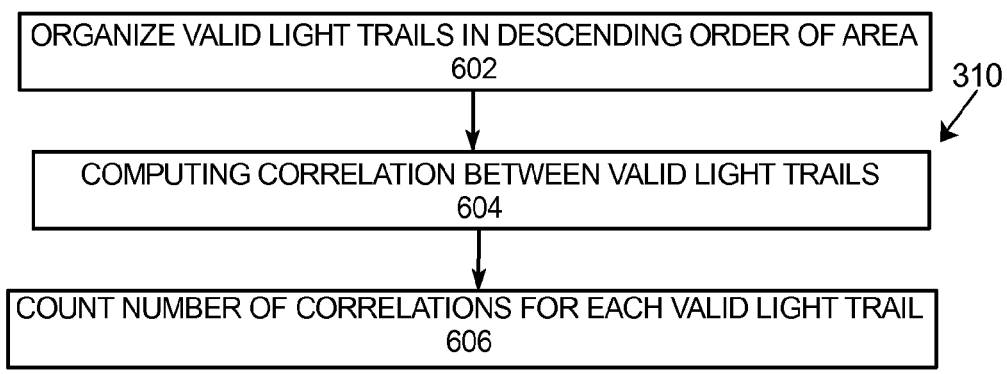
FIG. 6 is a flow chart that further illustrates another portion of the blur detection method of FIG. 3.

One method used to evaluate if there is a sufficient number of valid light trails that are oriented in a repetitive pattern is detailed in FIG. 6. More specifically, at step 602, the valid light trails are organized in descending order according the area of the valid light trails (largest area first and the smallest area last. Next, at step 604, for each valid light trail, the correlation with the other valid light trails that have smaller areas is computed. In certain embodiment, the correlation computation can be skipped if the difference in area or bounding box size is high, or distance between light trails exceeds certain predetermined separation distance. As one non-exclusive example, the correlation computation between valid light trails can be skipped if there is at least a fifty percent difference (the size difference in this example) in area or bounding box size, and/or the distance between light trails exceeds ¼ of the image size pixels (the predetermined separation distance in this example). However, it should be noted that the selected size difference and the selected predetermined separation distance can be different than these examples.

Next, at step 606, for each light trail, the numbers of matching light trails with a correlation higher than certain thresholds, e.g., a first strong correlation threshold and a second, weak correlation threshold. Subsequently, the number of light trails with both a weak matching number and a strong matching number that exceed certain thresholds (weak matching threshold, and strong matching threshold) are evaluated to determine if there is a sufficient number. Referring back to FIG. 3, if there is a sufficient number, at step 312, the image is considered containing sufficient repetitive light trails, and the image is classified as blurred. If there is an insufficient number of light trails with both a weak matching number and a strong matching number, at step 306, additional analysis is performed on the image to determine if it is blurred or sharp. In one embodiment, a weak matching number Threshold ($w\_TH$)_ is set to be higher than a strong matching Threshold ($s\_TH$). If an image has both a weak matching number that is greater than the weak matching number Threshold (#weak corr>$w\_TH$) and a strong matching number that is greater than the strong matching number Threshold (#strong corr>s_TH), the image is classified as blurry. Otherwise, additional analysis is performed In certain embodiments, to ensure a very low false positive rate, an additional distance constraint can be introduced to handle overlapping (or close to overlapping) light trails. If two matching light trails are very close (measured by the distance from their bounding boxes), only one of them is considered as valid matching. In this example, the test image is identified as blurry if there exists light trails with the number of weak matching and strong matching higher than certain thresholds after enforcing the distance constraint.

In summary, the present invention is able to accurately detect blurry night scene images even with the presence of "false" sharp information caused by saturated/near saturated light trails in the image. The present invention is a fast blur detection algorithm aiming to detect these challenging blurry night scene images with the presence of light trails. The present method disclosed herein (i) is relatively simple and fast, (ii) it can reach reasonable good blur detection accuracy for very challenging night scene blurry images with the presence of light trails, and (iii) it has fairly low false detection rate for sharp night scene images.

Figure 7:
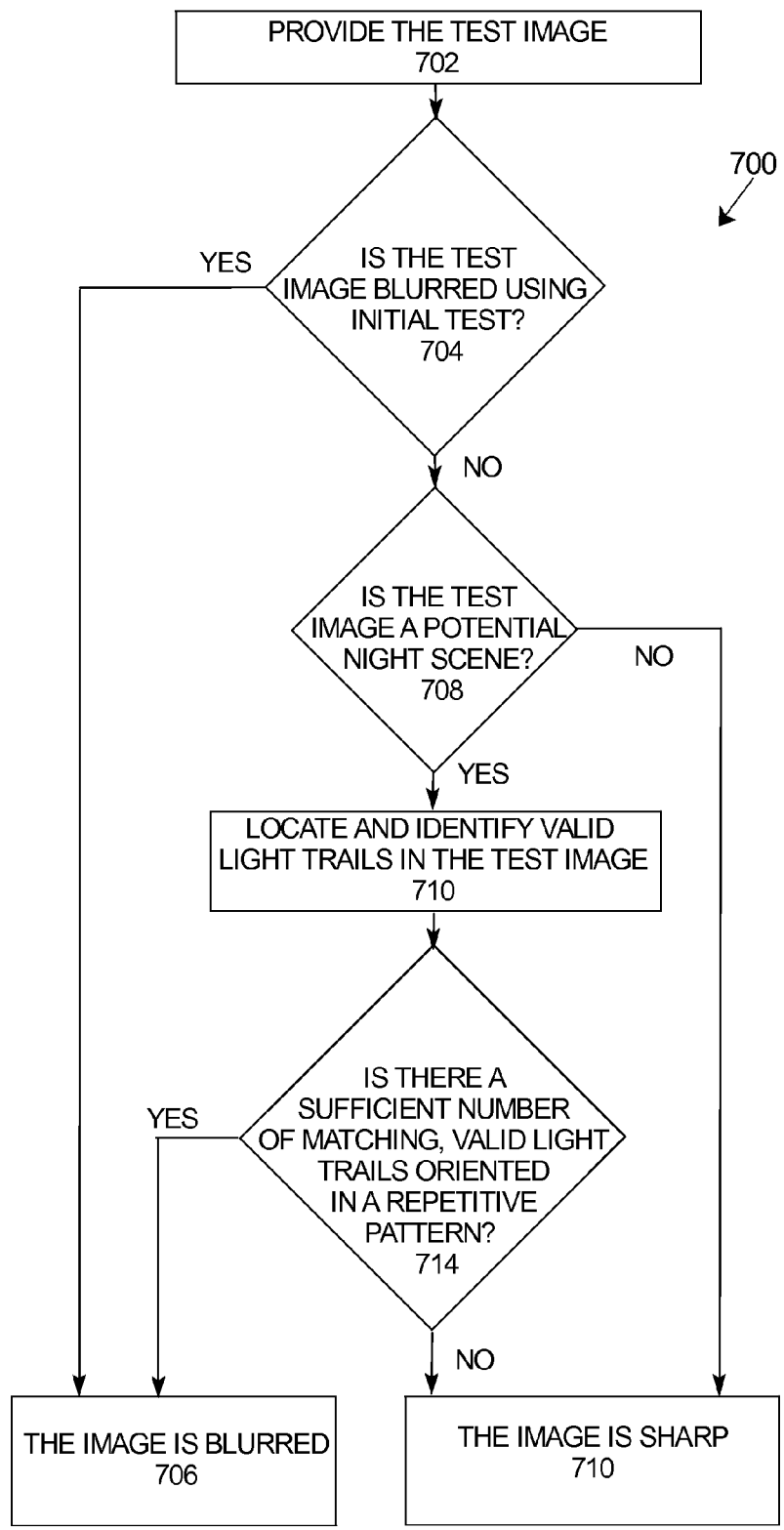
FIG. 7 is a flow chart that illustrates another embodiment of a blur detection method for night scenes having features of the present invention.

FIG. 7 is a flow chart that illustrates another embodiment of a blur detection method 700 having features of the present invention. As an overview, in this embodiment, the image is first tested with a conventional method to determine if the image is sharp according to the first test. Subsequently, if the image is sharp according to the first test, the night scene images are identified. For each identified night scene image, the light trails (saturated/near saturated lights) patterns are extracted from the test image. A night scene image is classified as blurry if there exists strong repetitive patterns of light trails.

More specifically, as illustrated in FIG. 7, at step 702, the test image is provided. For example, the test image can be captured by the camera for in camera processing of the image. Alternatively, the test image can be provided to a separate control system that utilizes the algorithm disclosed herein.

In this embodiment, at step 704, the image is first tested using a conventional method to determine if the image is blurred. Non-exclusive, suitable conventional methods are described above. If this test determines that the image is blurred, the image is classified as blurred at step 706. Alternatively, if this test determines that the image is sharp, the image is subjected to additional testing. More specifically, in this embodiment, at step 708, the present algorithm next determines if the image is a night scene. Accordingly, at step 708, the test image and/or the metadata of the camera relating to the test image is analyzed to determine if the test image is a potential night scene image. As provided above, the algorithm can determine if the test image is a potential night scene by analyzing the lighting condition at the time the test image was captured.

Next, if it is determined that the image is not a potential night scene, the control system classifies the image as sharp at step 710. Alternatively, if it is determined that the image is a potential night scene, at step 712, valid light trails are located and identified in the test image. This process is described above. Next, at step 714, the algorithm evaluates the valid light trails to determine if there is a sufficient number of matching valid light trails that are oriented in a similar direction (e.g. a repetitive pattern). This process is also described above. If there is a sufficient number, the image is classified as blurred at step 706, and if there is an insufficient number, the image is classified as sharp at step 710.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for determining if a test image is blurred, the method comprising the steps of;
    reviewing the pixel values in the test image with a control system that includes a processor to identify potential light trail pixels;
    reviewing the potential light trail pixels with the control system to identify valid light trails in the test image; and
    reviewing the valid light trails with the control system to identify the number of valid light trails with similar orientation and size to estimate if the test image is blurred with the control system.

2. The method of claim 1 further comprising the step of identifying if the test image is a potential night scene prior to the step of reviewing the potential light trail pixels.

3. The method of claim 1 further comprising the step of down sampling the test image prior to the step of reviewing the potential light trail pixels.

4. The method of claim 1, wherein the step of reviewing the potential light trail pixels includes the step of identifying saturated pixels in the image with the control system by identifying pixels having a value that is greater than a predetermined light saturation threshold.

5. The method of claim 4, wherein the step of reviewing the potential light trail pixels includes the step of building potential light trails from connected saturated pixels.

6. The method of claim 5, wherein the step of reviewing the potential light trail pixels includes the step of computing one or more region properties of the potential light trails and identifying valid light trails with the control system based on the region properties of the potential light trails.

7. The method of claim 1, further comprising the step of comparing the size and orientation of the valid light trails.

8. The method of claim 1, further comprising the step of comparing the proximity of the valid light trails.

9. A camera including a capturing system including an image sensor for capturing a test image, and a control system including a processor that utilizes the method of claim 1 to estimate if the test image is blurred.

10. An image apparatus for capturing an image, the image apparatus comprising:
    a capturing system including an image sensor for capturing the image; and
    a control system including a processor that estimates if the image is blurred by (i) reviewing the pixel values of the pixels in the image to identify potential light trail pixels; (ii) reviewing the potential light trail pixels to identify valid light trails in the test image, and (iii) reviewing the valid light trails to identify the number of valid light trails oriented in a similar pattern to estimate if the test image is blurred.

11. The image apparatus of claim 10 wherein the control system identifies if the test image is a potential night scene prior to identifying valid light trails.

12. The image apparatus of claim 10 wherein the control system down samples the test image prior to identifying valid light trails.

13. The image apparatus of claim 10 wherein the control system identifies saturated pixels in the image by identifying pixels that have a value that is greater than a predetermined light saturation threshold.

14. The image apparatus claim 13, wherein the control system builds potential light trails from connected saturated pixels.

15. The image apparatus of claim 14, wherein the control system computes one or more region properties of the potential light trails and identifies valid light trails based on the region properties of the potential light trails.

16. The image apparatus of claim 10, wherein the control system compares the size and orientation of the valid light trails.

17. The image apparatus of claim 10, wherein the control system compares the proximity of the valid light trails.

18. A method for evaluating a test image, the method comprising the steps of;
    capturing the test image with an image sensor of a camera;
    identifying if the test image is a potential night scene with a control system of the camera that includes a processor; and
    in the event the test image is identified as a potential night scene, (i) reviewing the pixel values of the pixels of the test image with the control system to identify pixels in the test image having a value that is greater than a predetermined light saturation threshold to identify saturated pixels with the control system, and (ii) reviewing the saturated pixels to identify valid light trails from connected saturated pixels with the control system; and (iii) comparing the valid light trails with the control system to estimate if the test image is blurred.

19. The method of claim 18 further comprising the step of down sampling the test image prior to the step of reviewing the saturated pixels.

20. The method of claim 18, wherein the step of reviewing the saturated pixels includes the step of computing one or more region properties of the potential light trails with the control system and identifying valid light trails with the control system based on the region properties of the potential light trails.

* * * * *